Patented June 19, 1923.

1,459,513

UNITED STATES PATENT OFFICE.

JAMES D. MONROE, OF BIRMINGHAM, ALABAMA.

MANUFACTURE OF VINEGAR.

No Drawing.     Application filed March 21, 1921. Serial No. 454,204.

*To all whom it may concern:*

Be it known that I, JAMES D. MONROE, a citizen of the United States of America, residing at Birmingham, in the county of Jefferson and State of Alabama, have invented certain new and useful Improvements in the Manufacture of Vinegar, of which the following is a specification.

This invention relates to a new and improved method for the manufacture of vinegar by means of which I am enabled to obtain a vinegar having a delightful and delicate fruit flavor while at the same time being of a high degree of strength.

It is the chief object of my invention to produce this vinegar by the utilization of yeast, prepared as described hereinafter, and sugar as the basis with a relatively small amount of flavoring acid, such as tartaric or acetic acid, the former being preferred.

In order that those skilled in the art may understand and be able to practice my improved method of manufacturing vinegar, I will now describe the steps incident to the manufacture of a fifty gallon batch of vinegar. To make up such a batch of vinegar I use the following elements:

50 lbs. of sugar, brown or white granulated, 1 gal. of yeast prepared as hereinafter described, 1½ lbs. of tartaric or acetic acid, and water to fill out the quantity.

To prepare the yeast as utilized in my process, I take two pounds of flour and three cakes of pure yeast, weighing approximately one ounce each, and I dissolve the yeast cakes in sufficient warm water and add it with sufficient additional warm water to the flour to make a thin paste or batter. This is allowed to set over night in a warm room and will rise to form a gallon of the light fluid yeast, as called for in the formula above. Having prepared the yeast as above described, I proceed as follows in compounding my vinegar: First, I put the gallon of yeast in a vat and then add the fifty pounds of sugar, stirring as it is added, and then add the pound and a half of acid, tartaric or acetic, and then add from 20 to 25 gallons of warm water about 75° F., and stir thoroughly until all the ingredients are thoroughly dissolved. I permit the mixture to stand for three hours as a settling period and I fill the vat up to the fifty gallon level with cold water as drawn from the water service mains.

The ingredients are then permitted to ferment for a period of one and a half days, during which time the fermentation process continues actively. If the vat is of a greater capacity than fifty gallons it is provided with an outlet at the fifty gallon level so that the rising products of fermentation can overflow, additions of water being made from time to time to maintain the batch at the fifty gallon level. This period of a day and a half covers approximately the period of active fermentation and after it is completed the batch is allowed to set and age in the vat for approximately six months without further additions of water. After this aging period, the vinegar is decanted from the vat and is ready for use. If it be desired to expedite the aging period, I have found this can be done by adding to the vinegar, after the completion of the active fermentation stage, about five gallons of finished vinegar made in accordance with my process, it being necessary when this addition of finished vinegar is made, to prepare the fifty gallon batch in a container which will hold this addition, and when the new batch is treated with this finished vinegar addition it will age in ten days and be then available for use.

The exact proportions given as above are those which by long continued use I have found most serviceable, but it is within the contemplation of my invention that they may be varied with proportionate results obtained in the flavor and strength of the resultant vinegar.

Having thus described my invention, what I claim as new and desire to secure by Letters Patent, is:—

1. A process for the manufacture of vinegar, which consists in combining liquid yeast, sugar, a flavoring acid and water, allowing the batch to stand during its period of active fermentation, removing excess products of fermentation during such period, and accelerating the aging of the product by the addition of previously aged vinegar.

2. A process for the manufacture of vinegar, which consists in combining liquid yeast, sugar, a flavoring acid and water, allowing the batch to stand during its period of active fermentation, removing excess products of such fermentation, and accelerating the aging of the resultant product by the addition of previously aged vinegar in volume approximately ten per cent of the batch.

In testimony whereof I affix my signature.

JAMES D. MONROE.

Witness:
NOMIE WELSH.